O. BOYER.
TRACTION WHEEL.
APPLICATION FILED FEB. 17, 1916.
1,202,785.
Patented Oct. 31, 1916.
3 SHEETS—SHEET 1.
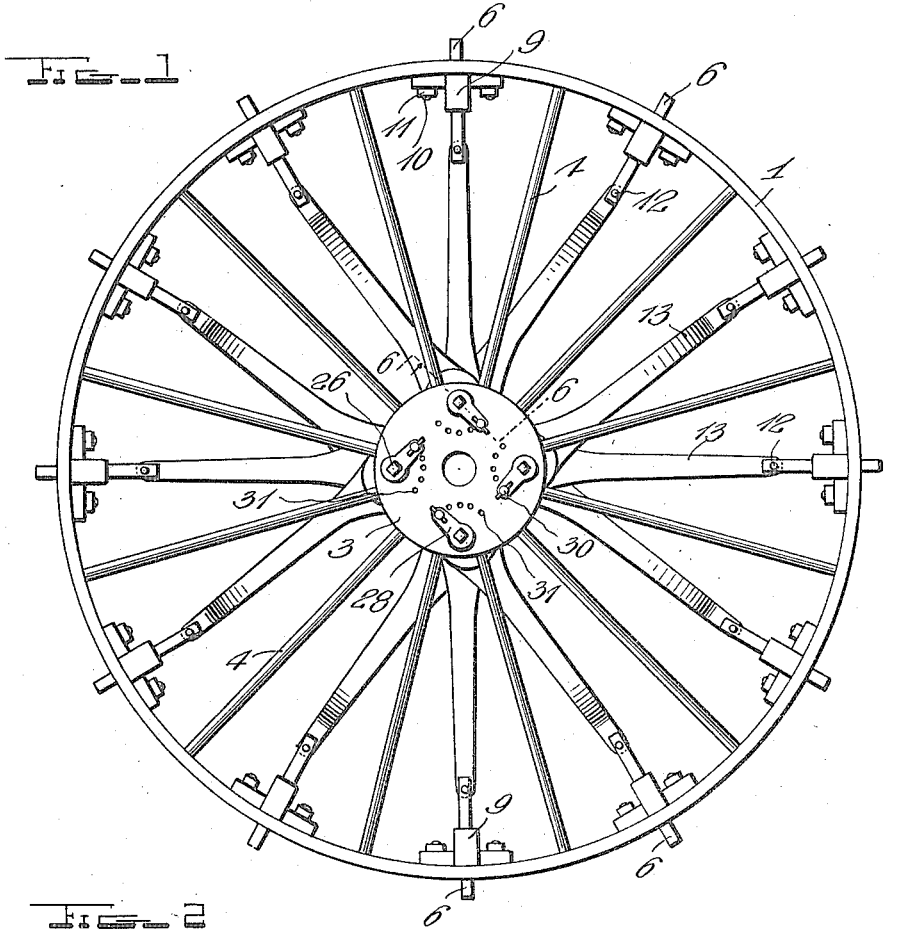
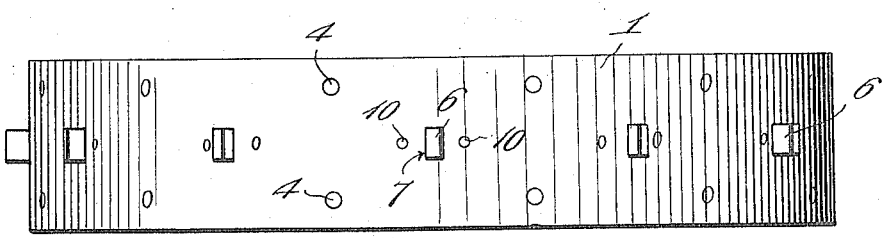
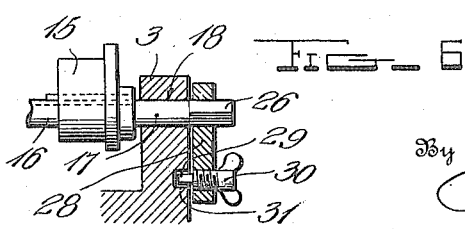
Inventor
Oliver Boyer
By John P. Duffie
Attorney

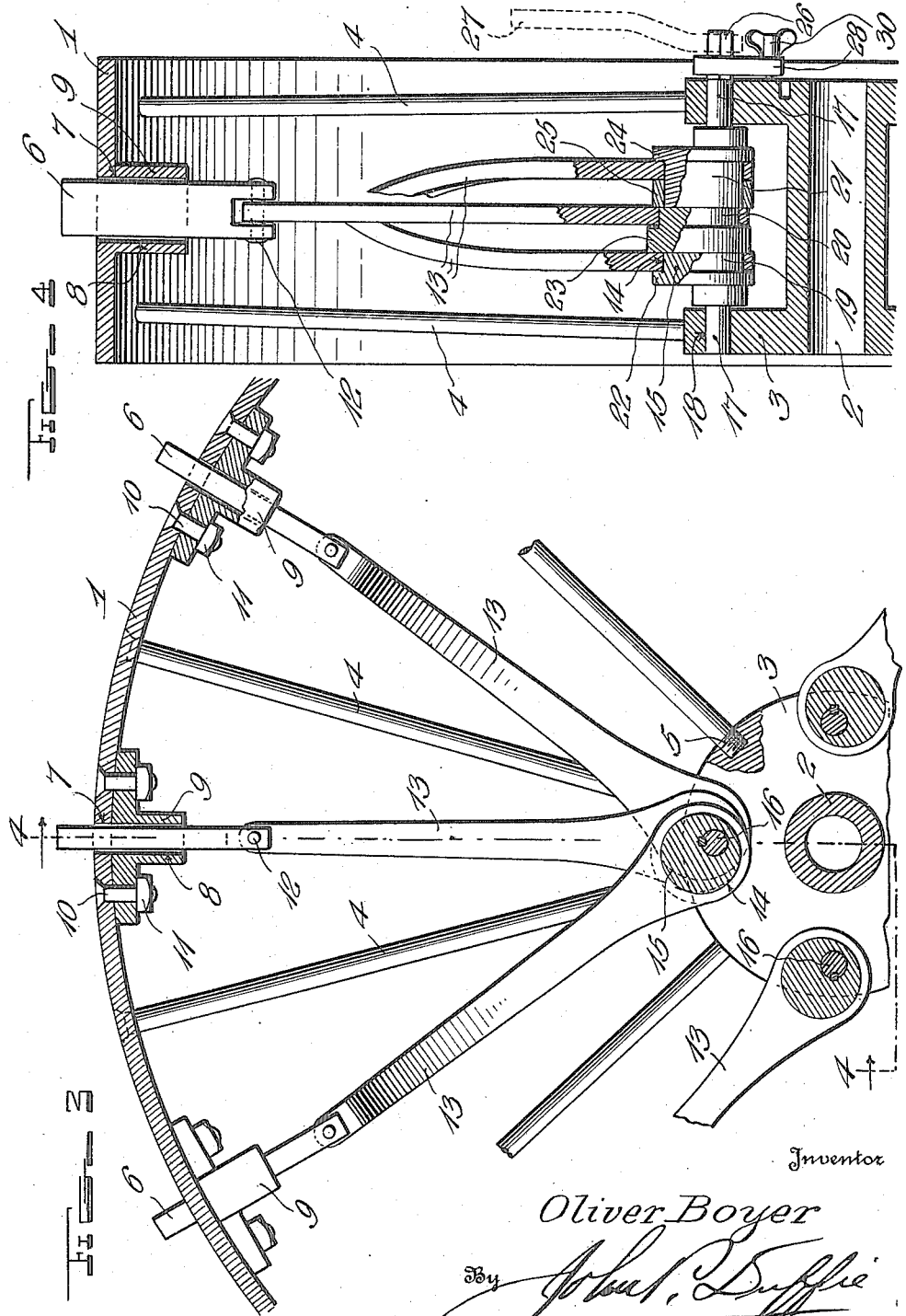

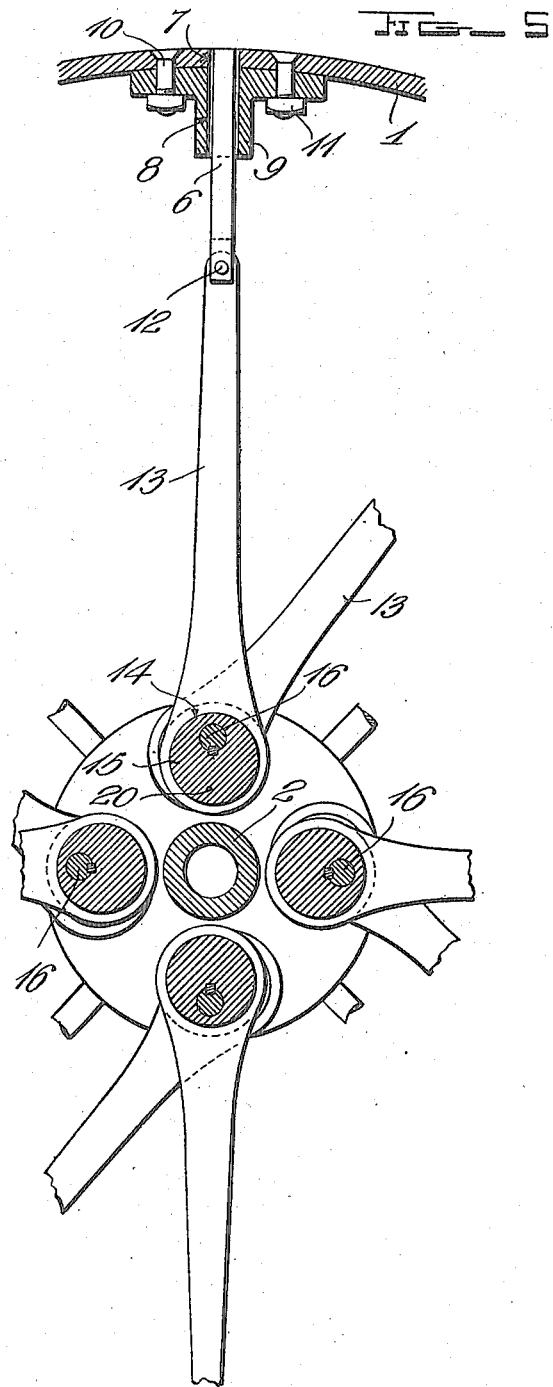

UNITED STATES PATENT OFFICE.

OLIVER BOYER, OF SPENCERVILLE, OHIO.

TRACTION-WHEEL.

1,202,785.   Specification of Letters Patent.   Patented Oct. 31, 1916.

Application filed February 17, 1916. Serial No. 78,881.

*To all whom it may concern:*

Be it known that I, OLIVER BOYER, a citizen of the United States, residing at Spencerville, in the county of Allen and State of Ohio, have invented certain new and useful Improvements in Traction-Wheels, of which the following is a specification.

This invention relates to new and useful improvements in traction wheels and consists in the novel construction, combination and arrangement of parts illustrated in the drawings and more particularly pointed out in the appended claims.

The object of this invention is to provide a traction wheel for traction-engines and agricultural machines, provided or equipped with a number of tractors or spurs which are adapted to be extended through the rim of the wheel to engage the ground, as the wheel is revolved and thus increase the "grip" in running over soft or muddy ground or soil, or which may be withdrawn until the outer ends of the tractors or spurs are flush with the outer surface of the wheel-rim when the wheels are passing over hard ground.

A further object of the invention is to provide means for varying the distances that the outer ends of the spurs or tractors may be projected beyond the wheel-rim, it being understood that the manipulation or adjustment of the spurs is accomplished while the wheel is at rest, and to provide means for holding or locking the spurs in adjusted position.

A further object of the invention is to carry out the foregoing with ease and facility and in a practical manner.

In the accompanying drawings in which like parts are designated by like characters throughout the several views:

Figure 1 is a side elevation of a traction-wheel embodying my improvements. Fig. 2 is a plan or edge view of Fig. 1. Fig. 3 is a vertical longitudinal fragmentary section, on an enlarged scale. Fig. 4 is a vertical transverse section, taken on line 4—4 of Fig. 3, looking in the direction indicated by the arrows. Fig. 5 is a vertical longitudinal section with the spurs or tractors entirely withdrawn or in inoperative position. Fig. 6 is a detail transverse sectional view, taken on line 6—6 of Fig. 1 looking in the direction indicated by the arrows, the parts being shown on an enlarged scale.

Referring to the drawings for a more particular description of the invention, 1 indicates the rim, 2 the hub provided with a pair of annular laterally spaced flanges 3 which are located at opposite ends of the hub and 4 the spokes extending radially between the rim and hub with the inner ends of the spokes having a screw-threaded engagement, as at 5, with corresponding sockets in the outer edges of said annular flanges, as shown more particularly in Fig. 3 of the drawings.

The tractors or spurs 6 are preferably of rectangular oblong form in cross-section and work through corresponding transverse apertures or openings 7 in the wheel rim and corresponding openings 8 in the guide bearings 9 secured to the inner surface or edge of the rim, as shown by the bolts and nuts 10 and 11, respectively, with the apertures of the guide bearings in registration or co-incident with those in the wheel-rim.

The spurs or tractors are pivotally connected at their inner ends, as at 12, with the links 13 provided at their enlarged inner ends with transverse circular openings 14 to receive the eccentrics 15 of the transverse eccentric shafts 16 journaled at opposite ends, as 17, in corresponding transverse openings 18 formed in the annular flanges 3 of the wheel hub, four eccentric shafts being shown in the present case which are spaced equi-distances apart around the hub. In this connection, it will be said that the apertures in the wheel rim, the guide bearings and the spurs or tractors are also located or spaced equi-distances apart around the circumference of the rim.

For the sake of illustration, I have shown twelve spurs or tractors, but in practice, I may use from 12 to 24, depending on the size of the wheel and the distance the spurs are placed apart.

Each eccentric shaft is capable of actuating or extending and withdrawing simultaneously, three spurs or tractors, and in order to accomplish this is provided at its central portion between the annular flanges 3 of the hub with three cams or eccentrics 19, 20, and 21 respectively, of the same diameter and shape, the cam or eccentric 19 being located at the rear or inside, the eccentric 20 at the center and eccentric 21 at the front or outside. As shown, the cams or eccentrics fit and work in the circular openings in the inner enlarged ends of the actuating links 13 and the inner ends of each set or series of links held in spaced relation by the annular flanges 22 and 23 formed at the inner faces of the eccentrics 19 and 20, the annular flange 24 formed at the outer face of the eccentric 21 and the independent spacing ring encircling the inner portion thereof, as more particularly shown in Fig. 4 of the drawings. The outer end of each eccentric shaft is provided with a square extension or wrench-engaging portion 26 adapted to be engaged by a wrench 27 indicated by the dotted lines in Fig. 4, used in partially rotating or turning the eccentric shafts in their bearings to project or withdraw the spurs or tractors, this operation being accomplished while the wheel is at rest.

In carrying out the invention, means is also provided to lock or hold the spurs in either extreme projected or withdrawn position or in a number of intermediate positions, that is, the outer ends of the spurs at different distances beyond the outer surfaces or edge of the rim between the two extreme positions. This is accomplished by equipping the outer square end or extension of each eccentric shaft with an arm 28 provided at its outer end with a square opening to receive said end of the shaft and employing a locking pin 29 in connection with each arm, said pin comprising an enlarged threaded body portion 30 having a screw-threaded engagement with a corresponding transverse opening in the free end of the arm. The annular flange 3 situated at the outer end of the hub is provided in its outer face with four arcuate series of recesses or sockets 31, as shown more paticularly in Fig. 1, one series for each arm and pin, any one of the recesses or sockets of each series being adapted to receive the corresponding locking pin 29 when the latter is screwed in for engagement therewith, the operation of the pins being facilitated by the wings or flanges 32 formed at the outer ends thereof. By employing the form of locking pin shown, it may be engaged with or disengaged from any of its series of recesses or sockets simply by turning it to the right or left and disengaged from a recess or socket without entirely unscrewing it from place. Also by employing a locking pin of the form shown, it will not work loose and fall out of place because of any jar or vibration the wheel may be subjected to in passing over the ground or soil and which would be likely to happen if a smooth locking pin were employed.

From the foregoing description taken in connection with the drawings, it is thought that the construction, operation and advantages of this invention will be readily understood without requiring a more extended explanation.

Various changes in the form, proportions and minor details of construction may be resorted to without departing from the scope or sacrificing any of the advantages of this invention, as defined by the appended claims.

Having described my invention, what I claim as new and desire to secure by Letters Patent, is:—

1. A traction wheel having spaced apertures in its rim, spurs or tractors working through said apertures, eccentric shafts journaled to the wheel hub and radially disposed links pivotally connected at their outer ends with the spurs and coöperating with the eccentric shafts to extend or withdraw the former, and means for holding or locking the spurs or tractors either in extreme extended or withdrawn position or in any one of a number of intermediate positions, between such extreme positions.

2. A traction wheel having spaced apertures in its rim, spurs or tractors working through said apertures, eccentric shafts journaled to the wheel hub, and radially disposed links pivotally connected at their outer ends with the spurs and coöperating with the eccentric shafts to extend or withdraw the former, means comprising inwardly extending arms arranged on the outer ends of the eccentric shafts and equipped at their free ends with locking pins for holding or locking the spurs or tractors either in extreme extended or withdrawn position or in any one of a number of intermediate positions between their two extreme positions to provide for varying the distances the outer ends of the spurs project beyond the outer edge of the wheel-rim.

3. A traction wheel having spaced apertures in its rim, spurs or tractors working through said apertures, a series of transverse eccentric shafts journaled to the wheel hub, each shaft being equipped with a series of eccentrics and adapted to simultaneously actuate a corresponding number of spurs or tractors and also provided with a square extension or wrench engaging portion at its outer end projecting beyond the outer end or face of the wheel-hub, links pivotally connected with the inner ends of the spurs and having openings at their inner ends to receive the eccentrics of the eccentric shafts, and means for holding or locking the tractors in either extreme extended or withdrawn position or in any one of a number of intermediate positions to vary the distances the outer ends of the spurs project beyond the outer edge of the rim, said means comprising inwardly extending arms carried by the square extensions of the shaft and locking pins having a threaded engagement with the free ends of the arms and each adapted to engage any one of an arcuate series of recesses in the outer face of the wheel hub, one series being provided for each locking pin.

4. A traction wheel having spaced apertures in its rim and four or more arcuate series of spaced recesses in the outer face of its hub, spurs or tractors working through the apertures of the rim, eccentric shafts, each equipped with a plurality of eccentrics, journaled to the hub and each having a square extension or wrench engaging portion at its outer end extending beyond the outer face of the hub, each shaft adapted to actuate a number of spurs, radial links pivotally connected with the inner ends of the tractors and having openings formed in their inner ends to receive the eccentrics of said shafts, inwardly extending arms carried by the square extensions of the eccentric shafts and a locking pin having a threaded engagement with the free end of each arm and adapted to engage any one of the coacting series of spaced recesses in the outer face of the hub in holding the spurs in adjusted position.

In testimony whereof I affix my signature in the presence of two witnesses.

OLIVER BOYER.

Witnesses:
CHAS. S. FRYER,
T. M. BERVE.

Copies of this patent may be obtained for five cents each, by addressing the "Commissioner of Patents, Washington, D. C."